United States Patent
Murray (10) Patent No.: US 9,722,982 B2
(45) Date of Patent: Aug. 1, 2017

(54) UNAUTHENTICATED ACCESS TO ARTIFACTS IN COMMERCE NETWORKS

(71) Applicant: INTUIT INC., Mountain View, CA (US)

(72) Inventor: Calum G. Murray, Santa Rosa, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 13/911,903

(22) Filed: Jun. 6, 2013

(65) Prior Publication Data

US 2014/0366090 A1    Dec. 11, 2014

(51) Int. Cl.
| | |
|---|---|
| *H04L 29/06* | (2006.01) |
| *H04L 29/08* | (2006.01) |
| *G06F 21/33* | (2013.01) |
| *G06Q 40/00* | (2012.01) |

(52) U.S. Cl.
CPC ............ *H04L 63/08* (2013.01); *G06F 21/335* (2013.01); *G06Q 40/12* (2013.12); *H04L 67/2895* (2013.01); *H04L 63/168* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 7,360,251 B2 | 4/2008 | Spalink et al. | |
| 2002/0082877 A1* | 6/2002 | Schiff et al. | ............ 705/5 |
| 2002/0111907 A1 | 8/2002 | Ling | |
| 2004/0123154 A1* | 6/2004 | Lippman et al. | ............ 713/201 |
| 2006/0277103 A1 | 12/2006 | Fujita et al. | |
| 2008/0262920 A1 | 10/2008 | O'Neill | |
| 2008/0307500 A1* | 12/2008 | Garnier De Falletans | ............ H04L 63/0853 726/3 |
| 2010/0235286 A1* | 9/2010 | Moore | ............ G06Q 10/107 705/76 |
| 2010/0280921 A1* | 11/2010 | Stone et al. | ............ 705/27 |
| 2011/0099104 A1* | 4/2011 | Nybom | ............ 705/41 |
| 2012/0060207 A1* | 3/2012 | Mardikar et al. | ............ 726/4 |
| 2013/0339188 A1* | 12/2013 | Mohamed et al. | ............ 705/26.41 |

FOREIGN PATENT DOCUMENTS

JP    2011018350 A    1/2011

* cited by examiner

*Primary Examiner* — Farid Homayounmehr
*Assistant Examiner* — Henry Tsang
(74) *Attorney, Agent, or Firm* — Patterson + Sheridan, LLP (57) ABSTRACT

The disclosed embodiments provide a system that facilitates business interaction. During operation, the system identifies a non-registered entity associated with an interaction within a commerce network. Next, the system enables, for the non-registered entity, access to an artifact associated with the interaction without requiring authentication of the non-registered entity.

15 Claims, 6 Drawing Sheets

UNAUTHENTICATED ACCESS TO ARTIFACTS IN COMMERCE NETWORKS

RELATED APPLICATION

The subject matter of this application is related to the subject matter in a co-pending non-provisional application by inventors Calum Murray, John J. Tumminaro and Jeffrey A. Langston and filed on the same day as the instant application, entitled "Using Commerce Networks to Facilitate Business Interactions Among Entities," having Ser. No. 13/911,890, and filed on 6 Jun. 2013.

BACKGROUND

Related Art

The disclosed embodiments relate to commerce networks. More specifically, the disclosed embodiments relate to techniques for enabling unauthenticated access to artifacts in commerce networks.

Financial-management applications may be used by individuals, small businesses, and/or organizations to perform financial transactions and/or manage finances. For example, a small business owner may use business-accounting software to generate payrolls, track inventory, manage invoices, track financial transactions, and/or generate reports. Similarly, an individual may use a tax-preparation application to prepare and file income taxes.

During use of such financial-management applications, financial transactions may be carried out by transmitting, exchanging, and/or processing data related to the financial transactions. However, the use of different applications, platforms, and/or communications mechanisms by different participants in the financial transactions may increase the overhead associated with performing the financial transactions.

For example, a business owner and a customer may use different business-accounting applications to manage finances and/or financial transactions. To obtain payment for goods or services rendered to the customer, the business owner may generate an invoice using a first business-accounting application and send the invoice to the customer over email. Upon receiving the email, the customer may download the invoice and/or view the invoice within a web browser and/or document viewer. Next, the customer may store a copy of the invoice in a second business-accounting application and use information from the invoice to mail and/or electronically transfer a payment to the business owner. Finally, the business owner may update his/her accounting records within the first business-accounting application with the payment, and the customer may independently update his/her accounting records within the second business-accounting application with the payment. In other words, multiple manual steps may be performed by both the business owner and customer to accommodate the inability of the two business-accounting applications to communicate with one another, thus increasing the complexity, time, effort, and/or user error associated with processing and paying the invoice.

Consequently, financial management may be facilitated by integrating mechanisms for performing financial transactions and/or exchanging data associated with the financial transactions.

SUMMARY

The disclosed embodiments provide a system that facilitates business interaction. During operation, the system identifies a non-registered entity associated with an interaction within a commerce network. Next, the system enables, for the non-registered entity, access to an artifact associated with the interaction without requiring authentication of the non-registered entity.

In some embodiments, the system also updates an identity of the non-registered entity based on at least one of the interaction, additional information associated with the non-registered entity, and analysis of the interaction or additional information.

In some embodiments, the system also uses the updated identity to facilitate subsequent use of the commerce network for the non-registered entity.

In some embodiments, using the updated identity to facilitate subsequent use of the commerce network for the non-registered entity involves enabling, for the non-registered entity, access to at least one of:
  (i) previously accessed artifacts;
  (ii) additional artifacts related to one or more of the previously accessed artifacts; and
  (iii) one or more subsequent interactions related to the interaction.

In some embodiments, the identity is updated within a model of the commerce network.

In some embodiments, the additional information is obtained from at least one of an endpoint of the commerce network and an external source.

In some embodiments, identifying the non-registered entity associated with the interaction involves:
  (i) obtaining identifying information for the non-registered entity from the interaction;
  (ii) attempting to find a match between the identifying information and an identity within the commerce network;
  (iii) if the match is found, including the identity in an authentication context for the non-registered entity; and
  (iv) if the match is not found, including a new identity for the non-registered entity in the authentication context.

In some embodiments, enabling, for the non-registered entity, access to the artifact without requiring authentication of the non-registered entity involves:
  (i) including the authentication context in a link to the artifact;
  (ii) providing the link to the non-registered entity; and
  (iii) providing the artifact to the non-registered entity based on the authentication context and the link.

In some embodiments, the artifact is provided to the non-registered entity through a generic endpoint of the commerce network.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
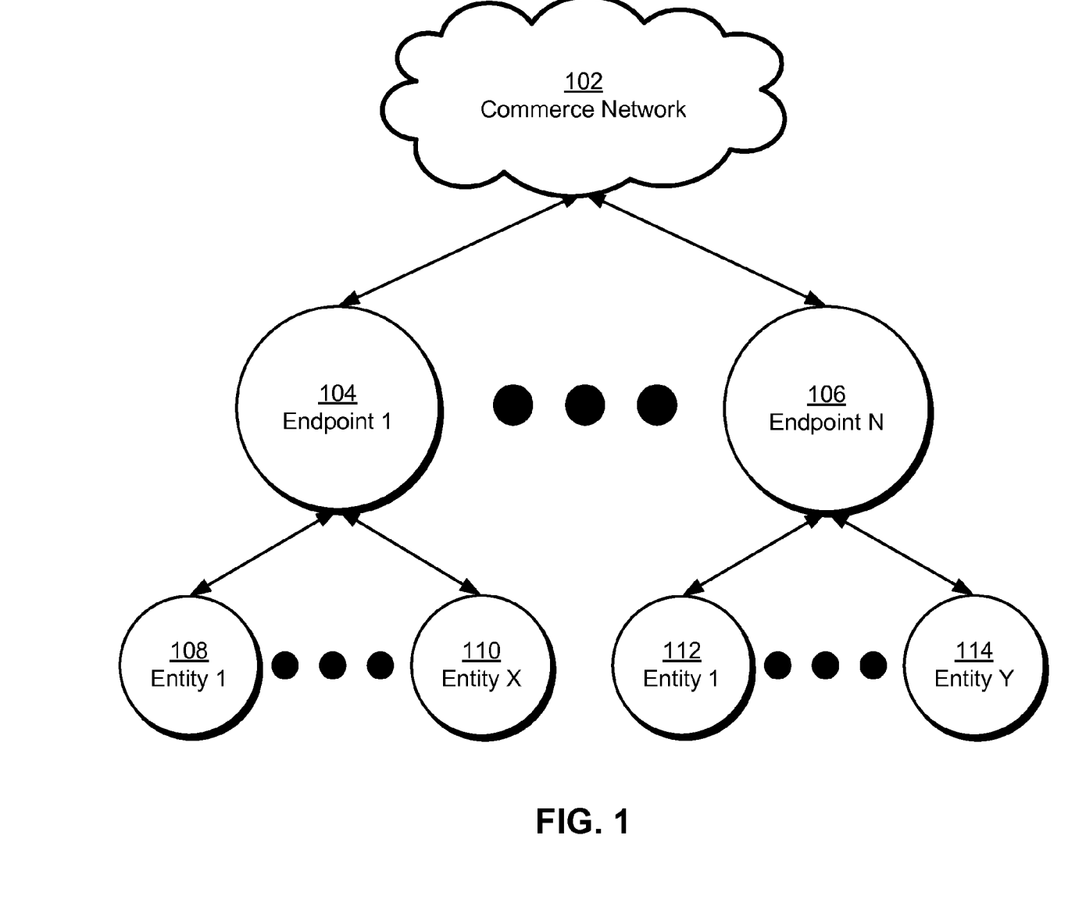
FIG. 1 shows a schematic of a system in accordance with the disclosed embodiments.

The disclosed embodiments provide a method and system for facilitating business interaction. As shown in FIG. 1, the business interaction may be conducted through a set of endpoints (e.g., endpoint 1 104, endpoint n 106) of a commerce network 102 by one or more sets of entities (e.g., entity 1 108, entity x 110, entity 1 112, entity y 114). Each entity may represent an individual, an organization (e.g., small business, company, non-profit organization, etc.), and/or a representative of the organization. In addition, the entities may use the endpoints and commerce network 102 to manage employees and payroll, generate and pay invoices, order inventory, file taxes, track accounts, and/or perform other operations related to financial transactions and/or commerce.

Each endpoint may provide an application, system, and/or platform used by a set of entities to manage finances and/or conduct financial transactions. For example, the endpoint may be a natively installed and/or web-based accounting application, tax-preparation application, investment-management application, contract- and/or spend-management application, customer-relationship-management application, enterprise resource planning (ERP) system, and/or other type of software system that facilitates management of business and/or financial interactions for entities using the software system.

The endpoint may also provide an interface for accessing commerce network 102. For example, the endpoint may connect to a set of services provided by commerce network 102 to facilitate commerce and/or business interactions (e.g., financial transactions) with entities at other endpoints of commerce network 102. In turn, commerce network 102 may connect the endpoints and allow the commerce and/or business interactions to occur across the endpoints. For example, commerce network 102 may aggregate data associated with the entities and interactions from the endpoints, enable access to the data by entities involved in the interactions through the endpoints, and/or allow the entities to interact through different endpoints.

In one or more embodiments, data associated with the entities, endpoints, and/or interactions is stored in a model of commerce network 102. The model may include unique identities for the entities, relationships among the entities, interactions related to commerce among the entities, and/or a set of activities associated with the entities. The model may then be updated based on the interactions and/or used to enable interactions among the entities across the endpoints. Using models of commerce networks to facilitate interactions among entities in the commerce networks is described in a co-pending non-provisional application by inventors Calum Murray, John J. Tumminaro and Jeffrey A. Langston and filed on the same day as the instant application, entitled "Using Commerce Networks to Facilitate Business Interactions Among Entities," having Ser. No. 13/911,890, and filing date Jun. 6, 2014, which is incorporated herein by reference.

As discussed in the above-referenced application, endpoints of commerce network 102 may include a consumer endpoint, a business endpoint, an external endpoint, and/or a generic endpoint. The generic endpoint may facilitate the use of commerce network 102 by entities that are not currently registered with commerce network 102 and/or other endpoints of commerce network 102. For example, the generic endpoint may be used by a user who does not have an existing user account with a consumer endpoint, business endpoint, and/or external endpoint of commerce network 102.

Figure 2:
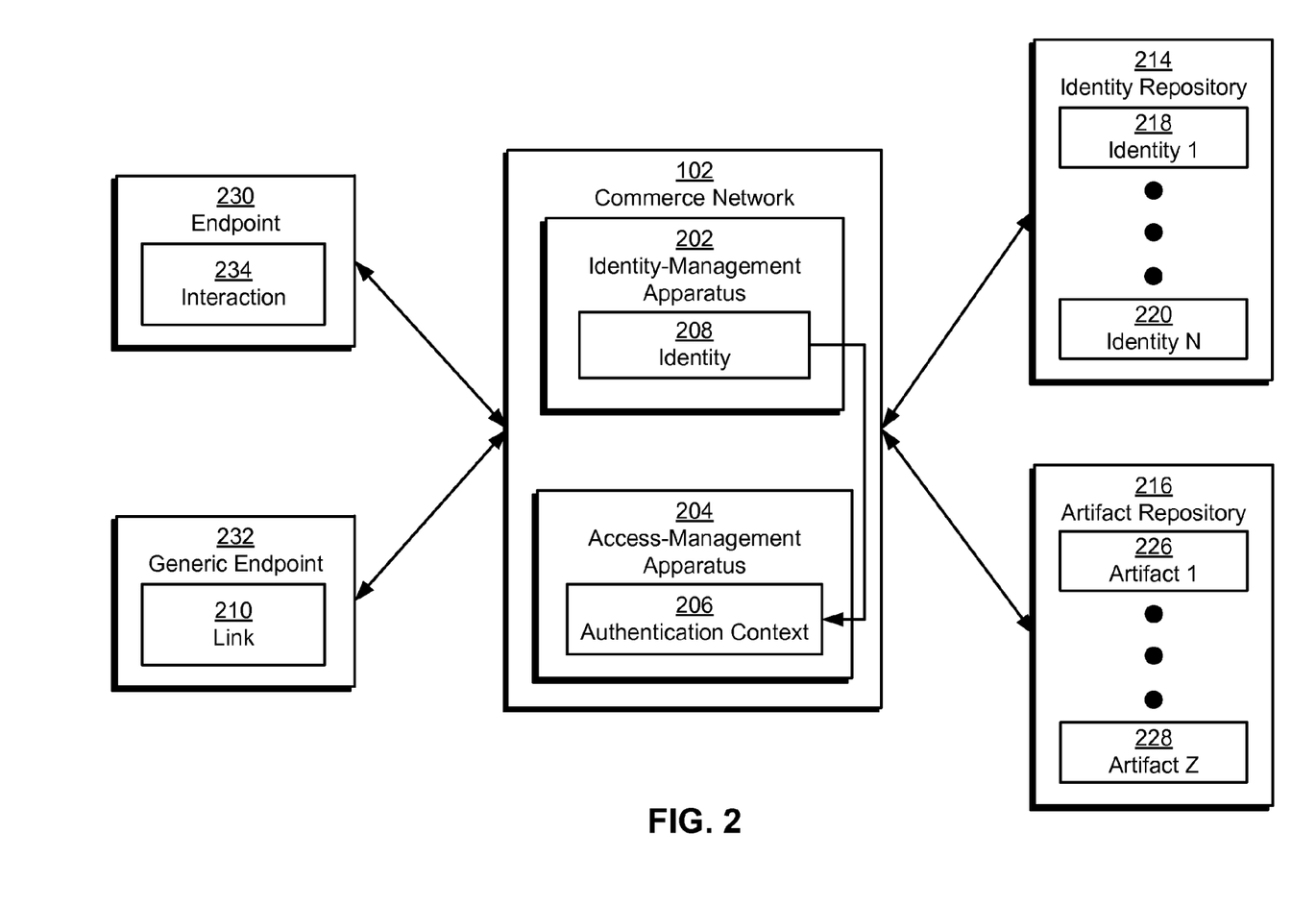
FIG. 2 shows a system for facilitating business interaction in accordance with the disclosed embodiments.

In addition, a non-registered entity may be exposed to the generic endpoint in response to an interaction from an entity that is registered within commerce network 102. As shown in FIG. 2, an interaction 234 involving the exchange of an artifact among two or more entities may be initiated at one endpoint 230 of commerce network 102 by an entity using endpoint 230. For example, interaction 234 may be use to exchange a message, document, payment, email, and/or other attribute and/or information related to interaction 234. The artifact may be obtained from the entity initiating the interaction by an endpoint (e.g., endpoint 230) used by the entity to access commerce network 102. The artifact may then be stored in an artifact repository 216, along with other artifacts (e.g., artifact 1 226, artifact z 228) from other interactions within commerce network 102. For example, the artifact may be stored in a relational database, filesystem, and/or other structured storage mechanism for documents, messages, and/or data.

To enable the interaction for a non-registered entity targeted by the interaction, commerce network 102 may provide a generic endpoint 232 through which the non-registered entity may access the artifact. In addition, generic endpoint 232 and/or commerce network 102 may allow the non-registered entity to access the artifact and/or other artifacts and/or services on commerce network 102 without requiring authentication of the non-registered entity with commerce network 102. For example, generic endpoint 232 and/or commerce network 102 may provide a web interface through which the non-registered entity may view and/or download the artifact without registering with and/or logging into commerce network 102.

First, an identity-management apparatus 202 in commerce network 102 may identify a non-registered entity associated with interaction 234. In particular, identity-management apparatus 202 may obtain identifying information for the non-registered entity from endpoint 230. The identifying information may be provided by the entity initiating interaction 234, along with the artifact to be exchanged using interaction 234. In other words, the identifying information may allow interaction 234 to be routed to the non-registered entity and/or other entities targeted by interaction 234. For example, the identifying information may include an email address, phone number, name, postal address, and/or other information that enables communication with the non-registered entity.

Next, identity-management apparatus 202 may attempt to find a match between the identifying information and an identity 208 within commerce network 102. For example, identity-management apparatus 202 may perform a query with an identity repository 214 containing a set of identities (e.g., identity 1 218, identity n 220) for entities in commerce network 102. If a matching identity (e.g., identity 208) is found in identity repository 214, an access-management apparatus 204 in commerce network 102 may include the identity in an authentication context 206 for the non-registered entity. If no identity in identity repository 214 matches the identifying information, a new identity (e.g., identity 208) for the non-registered entity is created and included in authentication context 206. The new identity may also be added to identity repository 214, and the identifying information may be included in the new identity to facilitate subsequent identification of the non-registered entity.

Authentication context 206 may then be used to enable access to the artifact by the non-registered entity without requiring authentication and/or registration of the non-registered entity with commerce network 102. More specifically, access-management apparatus 204 may include authentication context 206 in a link 210 to the artifact, and commerce network 102 may provide link 210 to the non-registered entity. For example, commerce network 102 may include link 210 in an email notification of interaction 234 to the non-registered entity.

Finally, the non-registered entity may use link 210 and generic endpoint 232 to access the artifact. For example, the non-registered entity may use link 210 to navigate to a web-based generic endpoint 232, and access-management apparatus 204 may obtain authentication context 206 and an identifier for the artifact from link 210. If authentication context 206 indicates that the non-registered entity is permitted to access the artifact, access-management apparatus 204 may allow the non-registered entity to view, download, and/or otherwise access the artifact and complete interaction 234. If authentication context 206 indicates that the non-registered entity is not permitted to access the artifact, access-management apparatus 204 may prevent the non-registered entity from accessing the artifact.

Identity-management apparatus 202 may also update identity 208 based on interaction 234 and/or additional information associated with the non-registered entity, and access-management apparatus 204 may use the updated identity 208 to facilitate subsequent use of commerce network 102 for the non-registered entity. For example, identity-management apparatus 202 may increase the level of "confidence" in identity 208 and/or the strength of a relationship between the non-registered entity and the entity initiating interaction 234 after interaction 234 is successfully completed. Identity-management apparatus 202 may also supplement identity 208 with other interactions between the non-registered entity and other entities in commerce network 102, information associated with identity 208 from external sources such as public records, financial institutions, and/or credit agencies, and/or insights gained from analysis of the interaction(s) and/or information.

As identity 208 is updated over time, access-management apparatus 204 may grant access to additional data and/or services in commerce network 102 to the non-registered entity. First, access-management apparatus 204 may enable access to previously accessed artifacts, such as messages, payments, and/or documents associated with past interactions involving the non-registered entity. Access-management apparatus 204 may also allow the non-registered entity to access additional artifacts related to one or more of the previously accessed artifacts. For example, access-management apparatus 204 may allow the non-registered entity to view an estimate related to an invoice transmitted using interaction 234 after the non-registered entity has completed a pre-specified number of interactions and/or paid a pre-specified number of invoices within commerce network 102. Finally, access-management apparatus 204 may enable one or more subsequent interactions related to interaction 234. For example, access-management apparatus 204 may allow the non-registered entity to pay an invoice and/or ask a question about the invoice after receiving the invoice through interaction 234. In other words, access-management apparatus 204 may manage access control for the non-registered entity based on the level of "trust" in the non-registered entity.

By enabling limited use of commerce network 102 by non-registered entities without requiring the non-registered entities to register and/or authenticate themselves with commerce network 102, the system of FIG. 2 may increase use of commerce network 102 without compromising the security and/or confidentiality of artifacts in commerce network 102. Moreover, the system of FIG. 2 may provide a centralized mechanism for carrying out business interactions for both registered and non-registered entities of commerce network 102, thus reducing the overhead and/or complexity associated with performing the business interactions. Finally, the functionality provided to the non-registered entities may encourage the non-registered entities to join commerce network 102, resulting in an additional increase in the use of commerce network 102 and/or the value of commerce network 102 to all entities in commerce network 102.

Figure 3:
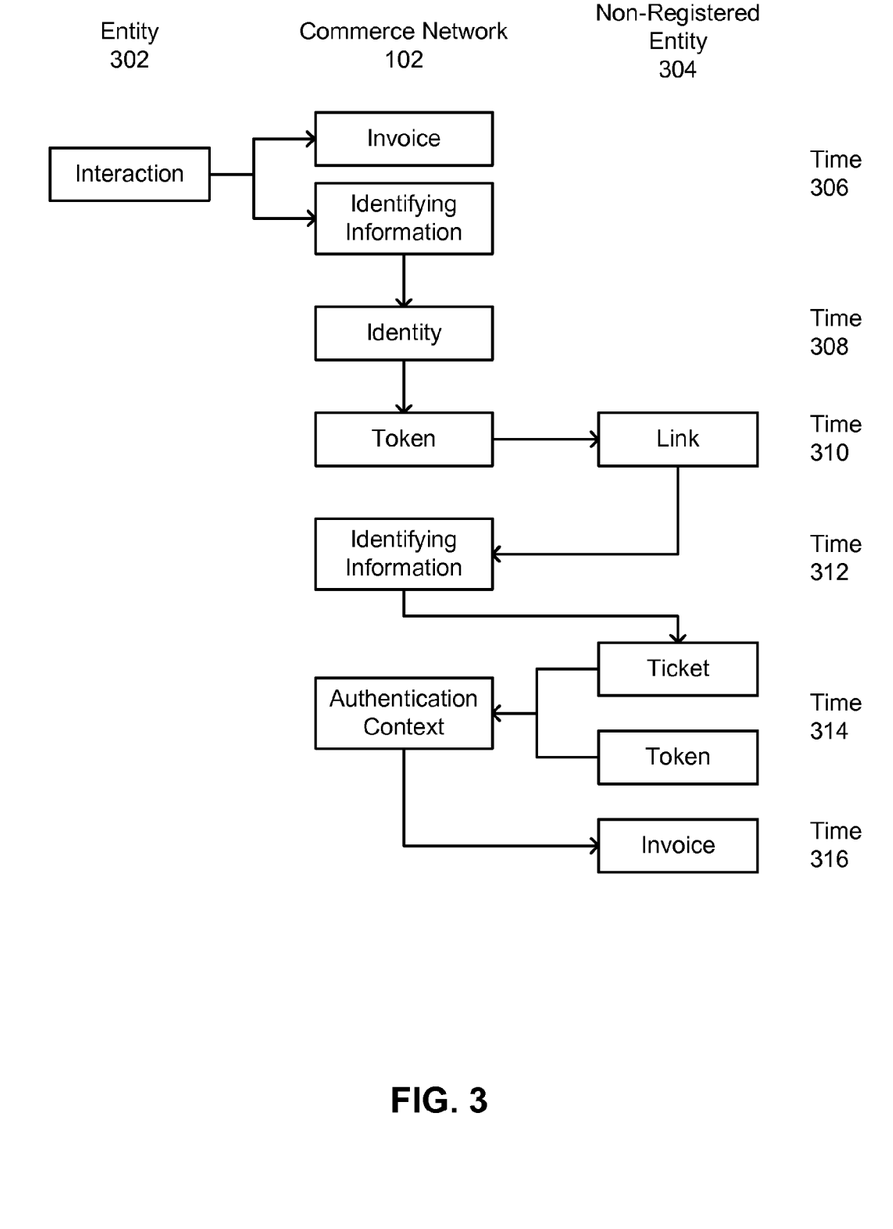
FIG. 3 shows an exemplary timeline of operations associated with unauthenticated access to an artifact in a commerce network in accordance with the disclosed embodiments.

FIG. 3 shows an exemplary timeline of operations associated with unauthenticated access to an artifact in commerce network 102 in accordance with the disclosed embodiments. Beginning at time 306, an entity 302 in commerce network 102 may initiate an interaction by providing an invoice and identifying information for a non-registered entity 304 targeted in the interaction to commerce network 102. For example, entity 302 may create and/or upload the invoice using an endpoint of commerce network 102 and provide an email address, phone number, name, and/or other contact information for non-registered entity 304 to the endpoint.

At time 308, commerce network 102 may establish an identity for non-registered entity 304 from the identifying information. For example, commerce network 102 may attempt to find a match between the identifying information and an identity within commerce network 102. If a match is found, commerce network 102 may include the identity in an authentication context for the non-registered entity. If the match is not found, commerce network 102 may create a new identity for the non-registered entity and include the new identity in the authentication context.

At time 310, commerce network 102 may generate a token that includes an identifier for the invoice and the identity of non-registered entity and include the token in a link that is provided to non-registered entity 304. For example, commerce network 102 may embed the token in a uniform resource locator (URL) that links to the invoice and transmit the URL in an email to non-registered entity 304.

At time 312, non-registered entity 304 may use the link to access commerce network 102, and commerce network 102 may obtain the identifying information and/or identity of non-registered entity 304 from the token in the link. For example, non-registered entity 304 may use the link to navigate to a generic endpoint of commerce network 102, and commerce network 102 may resolve the email address, name, phone number, and/or other identifying information for non-registered entity 304 from the token.

At time 314, non-registered entity 304 may obtain a ticket (e.g., authentication ticket) using the identifying information, and provide the ticket and token to commerce network 102 to establish an authentication context for non-registered entity 304. More specifically, commerce network 102 may generate the ticket based on the identifying information for non-registered entity 304, thus "authenticating" non-registered entity 304 based on the identifying information. In addition, the identifying information may be obtained from the token instead of non-registered entity 304, thus allowing non-registered entity 304 to access commerce network 102 without providing authentication credentials to commerce network 102 and/or manually inputting the identifying information.

After the authentication context is established, commerce network 102 may provide non-registered entity 304 with the invoice at time 316. For example, commerce network 102 may use the ticket and token to determine if non-registered entity 304 is granted access to the invoice. If non-registered entity 304 is allowed to access the invoice, commerce network 102 may enable viewing and/or downloading of the invoice by non-registered entity 304. If non-registered entity 304 is not allowed to access the invoice, commerce network 102 may prevent non-registered entity 304 from viewing and/or downloading the invoice.

As described above, commerce network 102 may also facilitate subsequent use of commerce network 102 by non-registered entity 304 based on previous use of commerce network 102 and/or additional information associated with non-registered entity 304. For example, commerce network 102 may use a history of previous interactions (e.g., transmission of documents, payments, etc.) involving non-registered entity 304 to grant non-registered entity 304 access to artifacts associated with the previous interactions and/or additional artifacts related to the artifacts. Commerce network 102 may also allow non-registered entity 304 to follow up on the invoice by paying the invoice and/or asking a question about the invoice, if non-registered entity 304 has an established history of interactions in commerce network 102 and/or public records indicate that non-registered entity 304 is likely not to be fraudulent.

Figure 4:
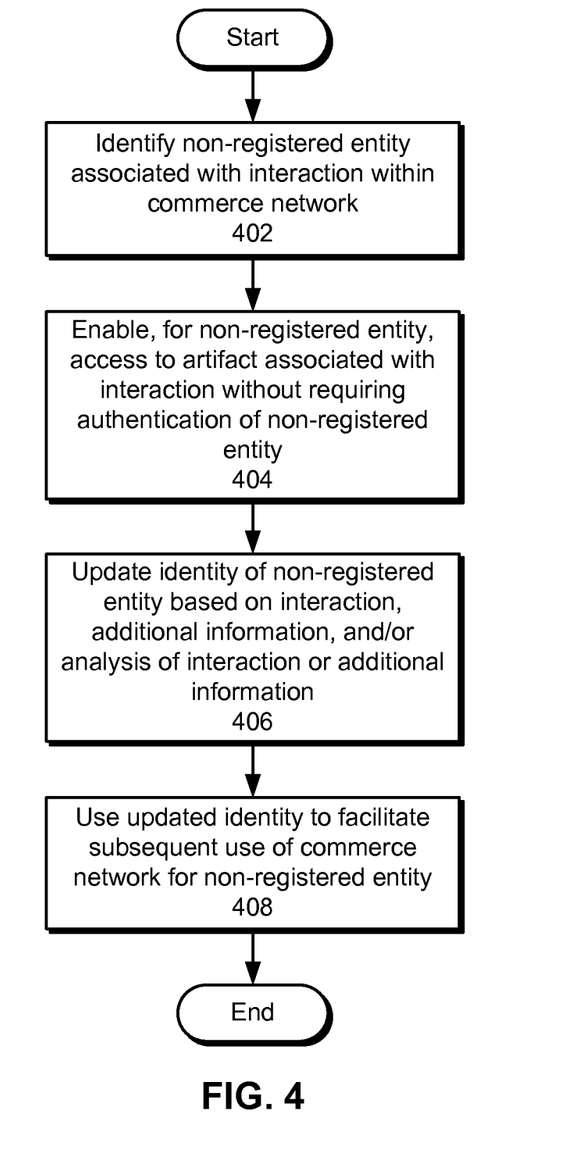
FIG. 4 shows a flowchart illustrating the process of facilitating business interaction in accordance with the disclosed embodiments.

FIG. 4 shows a flowchart illustrating the process of facilitating business interaction in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a non-registered entity associated with interaction within a commerce network is identified (operation 402). For example, the non-registered entity may be targeted in an interaction initiated by an entity that is registered with the commerce network. Next, access to an artifact associated with the interaction is enabled for the non-registered entity without requiring authentication of the non-registered entity (operation 404), as discussed in further detail below with respect to FIG. 5.

The identity of the non-registered entity is then updated based on the interaction, additional information associated with the non-registered entity, and/or analysis of the interaction or additional information (operation 406). For example, information about the interaction may be obtained from one or more endpoints of the commerce network and analyzed to increase the level of "confidence" in the identity of the non-registered entity and/or the strength of a relationship between the non-registered entity and one or more other entities participating in the interaction. Public records, credit rating agencies, financial institutions, and/or other external sources may also be used to verify the trustworthiness, identity, and/or reliability of the non-registered entity. Updates to the identity and/or non-registered entity may additionally be included in a model of the commerce network to facilitate tracking of the use of the commerce network by the non-registered entity and/or other entities.

Finally, the updated identity is used to facilitate subsequent use of the commerce network for the non-registered entity (operation 408). For example, an increase in the number of interactions, number of relationships, reliability, and/or "confidence" in the identity of the non-registered entity may enable access to previously accessed artifacts, additional artifacts related to the previously accessed artifacts, and/or subsequent interactions related to the interaction for the non-registered entity.

Figure 5:
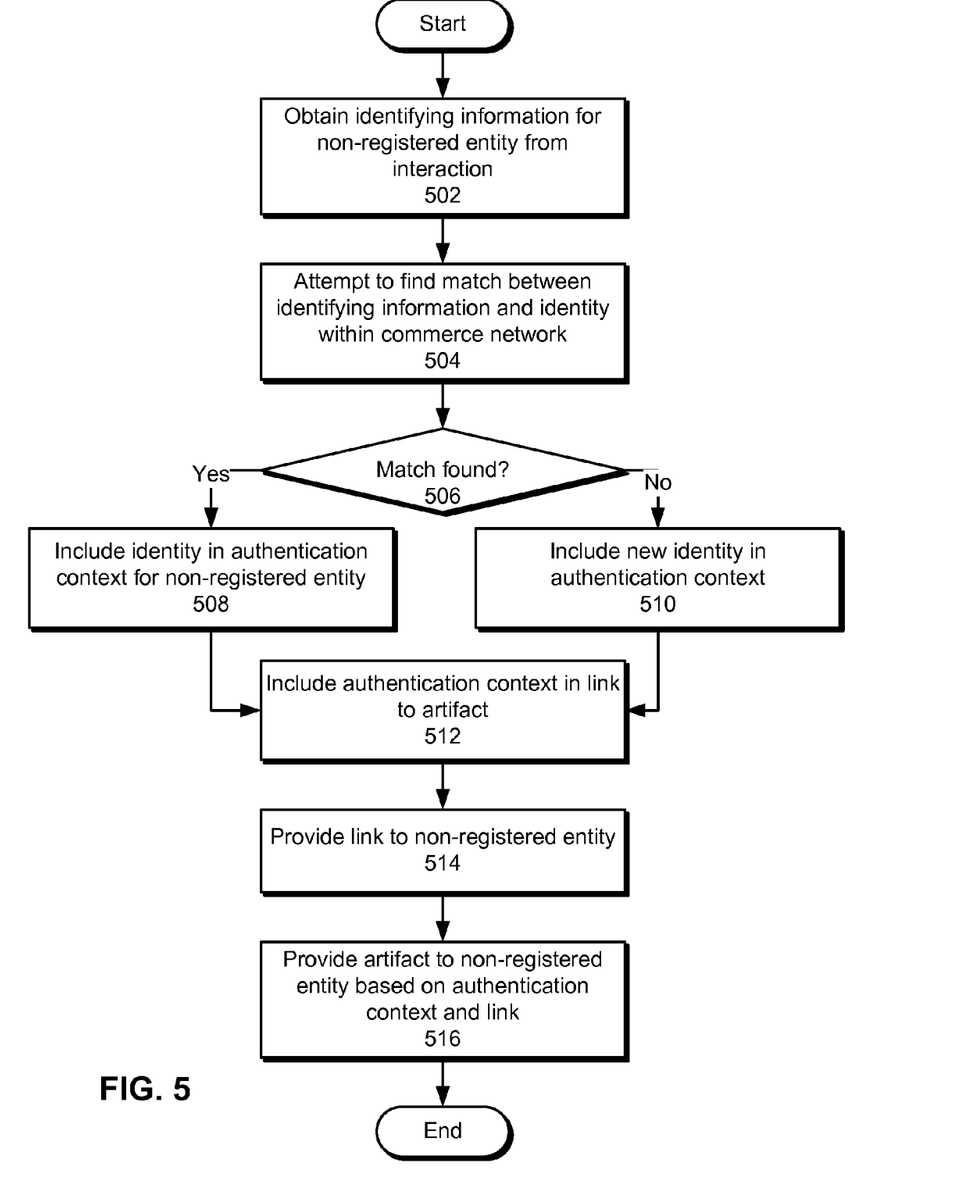
FIG. 5 shows a flowchart illustrating the process of enabling unauthenticated access to an artifact in a commerce network in accordance with the disclosed embodiments.

FIG. 5 shows a flowchart illustrating the process of enabling unauthenticated access to an artifact in a commerce network in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, identifying information for a non-registered entity is obtained from an interaction (operation 502). For example, the interaction may specify an email address, phone number, postal address, name, and/or other contact information for the non-registered entity. Next, an attempt to find a match between the identifying information and an identity within the commerce network (operation 504) is made. For example, a relational database and/or other identity repository of the commerce network may be queried for an identity matching and/or containing the identifying information.

An authentication context for the entity may then be generated based on the presence or absence of the match (operation 506). If the match is found, the identity matching the identifying information is included in an authentication context for the non-registered entity (operation 508). If no match is found, a new identity for the non-registered entity is included in the authentication context (operation 510).

The authentication context is, in turn, included in a link to the artifact (operation 512), and the link is provided to the non-registered entity (operation 514). Finally, the artifact is provided to the non-registered entity based on the authentication context and the link (operation 516). For example, a token identifying the non-registered entity and the artifact may be included in the link. After the non-registered entity navigates to a generic endpoint of the commerce network using the link, the token may be used to verify the identity of the non-registered entity and access to the artifact by the non-registered entity. The artifact may then be provided to the non-registered entity if the non-registered entity is granted access to the artifact.

Figure 6:
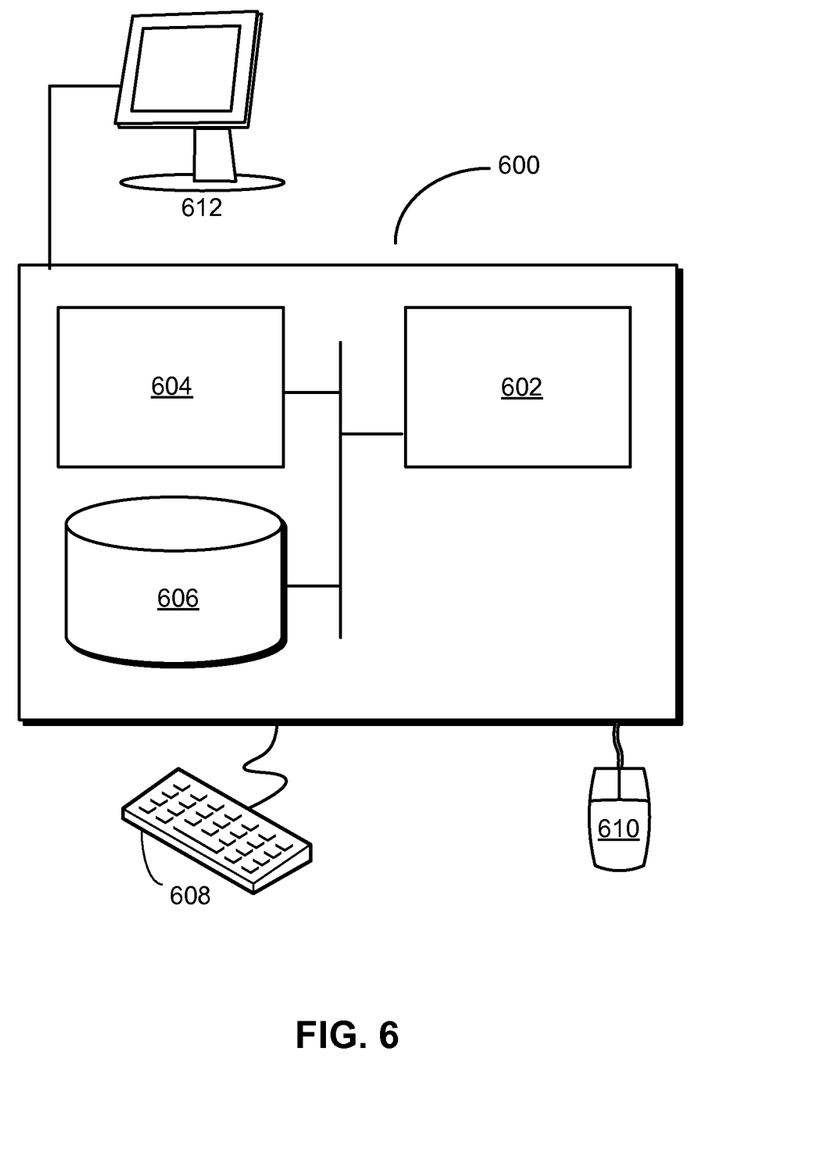
FIG. 6 shows a computer system in accordance with the disclosed embodiments.

FIG. 6 shows a computer system 600 in accordance with an embodiment. Computer system 600 may correspond to an apparatus that includes a processor 602, memory 604, storage 606, and/or other components found in electronic computer systems. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, FIG. 6 provides a system for facilitating business interaction. The system may include an identity-management apparatus that identifies a non-registered entity associated with an interaction within a commerce network. The system may also include an access-management apparatus that enables, for the non-registered entity, access to an artifact associated with the interaction without requiring authentication of the non-registered entity. The identity-management apparatus may also update an identity of the non-registered entity based on the interaction and/or additional information associated with the non-registered entity, and the modeling apparatus may use the updated identity to facilitate subsequent use of the commerce network for the non-registered entity.

In addition, one or more components of computer system 600 may be remotely located and connected to the other components over a network. Portions of the present embodiments (e.g., identity-management apparatus, access-management apparatus, endpoints, entities, etc.) may also be located on different nodes of a distributed system that implements the embodiments. For example, the present embodiments may be implemented using a cloud computing system that facilitates access to a set of artifacts associated with a set of interactions in a commerce network by a set of remote non-registered entities through a generic endpoint of the commerce network.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for accessing an artifact without authenticating a party requesting access to the artifact facilitating business interaction, comprising:
    identifying a non-registered entity associated with an interaction within a commerce network, wherein the commerce network comprises:
        a first endpoint installed on a first computing device, the first end point accessible to the non-registered entity; and
        a second endpoint installed on a second computing device, the second end point accessible to an entity registered within the commerce network, the interaction being conducted through the first endpoint and the second endpoint;
    enabling for the non-registered entity, access to the artifact associated with the interaction without requiring authentication of the non-registered entity, by:
        obtaining, by computer, identifying information for the non-registered entity from the interaction,
        determining whether there is a match between the identifying information and an identity within the commerce network;
        upon determining the match is found, including the identity in an authentication context for the non-registered entity,
        upon determining the match is not found, including a new identity for the non-registered entity in the authentication context,
        providing a link to the artifact to the non-registered entity, wherein the link includes the authentication context, and
        providing the artifact to the non-registered entity based on the authentication context and the link; and
    enabling access to additional artifacts within the commerce network without authenticating the non-registered entity.

2. The computer-implemented method of claim 1, further comprising:
    updating an identity of the non-registered entity based on at least one of the interaction, additional information associated with the non-registered entity, and analysis of the interaction or additional information.

3. The computer-implemented method of claim 2, further comprising:
    using the updated identity to facilitate subsequent use of the commerce network for the non-registered entity.

4. The computer-implemented method of claim 3, wherein using the updated identity to facilitate subsequent use of the commerce network for the non-registered entity involves:
    enabling, for the non-registered entity, access to at least one of:
        previously accessed artifacts;
        additional artifacts related to one or more of the previously accessed artifacts; and
        one or more subsequent interactions related to the interaction.

5. The computer-implemented method of claim 2, wherein the identity is updated within a model of the commerce network.

6. The computer-implemented method of claim 2, wherein the additional information is obtained from at least one of:

an endpoint of the commerce network; and an external source.

7. The computer-implemented method of claim 1, wherein the artifact is provided to the non-registered entity through a generic endpoint of the commerce network.

8. A system for accessing an artifact without authenticating a party requesting access to the artifact, comprising:
   a memory;
   a processor;
   a non-transitory storage medium storing instructions, that when executed on the processor, instantiate an identity-management apparatus and an access-management apparatus;
   the identity-management apparatus configured to identify a non-registered entity associated with an interaction within a commerce network, wherein the commerce network comprises:
      a first endpoint installed on a first computing device, the first end point accessible to the non-registered entity; and
      a second endpoint installed on a second computing device, the second end point accessible to an entity registered within the commerce network, the interaction being conducted through the first endpoint and the second endpoint;
   the access-management apparatus configured to enable, for the non-registered entity, access to the artifact associated with the interaction without requiring authentication of the non-registered entity, by;
      the identity-management apparatus further configured to obtain identifying information for the non-registered entity from the interaction,
      the identity-management apparatus further configured to determine whether there is a match between the identifying information and an identity within the commerce network,
      the identity-management apparatus further configured to include the identity in an authentication context for the non-registered entity if the match is found,
      the identity-management apparatus further configured to include a new identity for the non-registered entity in the authentication context if the match is not found,
      the identity-management apparatus further configured to provide a link to the artifact to the non-registered entity, wherein the link includes the authentication context, and
      the identity-management apparatus further configured to provide the artifact to the non-registered entity based on the authentication context and the link; and
   the access-management apparatus further configured to enable access to additional artifacts within the commerce network without authenticating the non-registered entity.

9. The system of claim 8, wherein the identity-management apparatus is further configured to:
   update an identity of the non-registered entity based on at least one of the interaction, additional information associated with the non-registered entity, and analysis of the interaction or additional information.

10. The system of claim 9, wherein the access-management apparatus is further configured to:
   use the updated identity to facilitate subsequent use of the commerce network for the non-registered entity.

11. The system of claim 10, wherein using the updated identity to facilitate subsequent use of the commerce network for the non-registered entity involves:

enabling, for the non-registered entity, access to at least one of:
   previously accessed artifacts;
   additional artifacts related to one or more of the previously accessed artifacts; and
   one or more subsequent interactions related to the interaction.

12. A non-transitory computer-readable storage medium storing instructions that when executed by a computer cause the computer to perform a method for accessing an artifact without authenticating a party requesting access to the artifact, the method comprising:
   identifying a non-registered entity associated with an interaction within a commerce network, wherein the commerce network comprises:
      a first endpoint installed on a first computing device, the first end point accessible to the non-registered entity; and
      a second endpoint installed on a second computing device, the second end point accessible to an entity registered within the commerce network, the interaction being conducted through the first endpoint and the second endpoint;
   enabling, for the non-registered entity, access to the artifact associated with the interaction without requiring authentication of the non-registered entity, by;
      obtaining identifying information for the non-registered entity from the interaction;
      determining whether there is a match between the identifying information and an identity within the commerce network,
      upon determining the match is found, including the identity in an authentication context for the non-registered entity,
      upon determining the match is not found, including a new identity for the non-registered entity in the authentication context,
      providing a link to the artifact to the non-registered entity, wherein the link includes the authentication context, and
      providing the artifact to the non-registered entity based on the authentication context and the link; and
   enabling access to additional artifacts within the commerce network without authenticating the non-registered entity.

13. The non-transitory computer-readable storage medium of claim 12, the method further comprising:
   updating an identity of the non-registered entity based on at least one of the interaction, additional information associated with the non-registered entity, and analysis of the interaction or additional information.

14. The non-transitory computer-readable storage medium of claim 13, the method further comprising:
   using the updated identity to facilitate subsequent use of the commerce network for the non-registered entity.

15. The non-transitory computer-readable storage medium of claim 14, wherein using the updated identity to facilitate subsequent use of the commerce network for the non-registered entity involves:

enabling, for the non-registered entity, access to at least one of:
  previously accessed artifacts;
  additional artifacts related to one or more of the previously accessed artifacts; and
  one or more subsequent interactions related to the interaction.

\* \* \* \* \*